United States Patent
Chai et al.

(10) Patent No.: US 11,914,663 B2
(45) Date of Patent: Feb. 27, 2024

(54) GENERATING DIVERSE ELECTRONIC SUMMARY DOCUMENTS FOR A LANDING PAGE

(71) Applicant: Microsoft Technology Licensing, LLC, Redmond, WA (US)

(72) Inventors: Junyi Chai, Pasadena, CA (US); Konstantin Andreyevich Golobokov, Seattle, WA (US); Bingyu Chi, New York, NY (US); Fang Gu, Sammamish, WA (US); Ye Dong, Redmond, WA (US); Jie Cao, Sammamish, WA (US); Yi Liu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 163 days.

(21) Appl. No.: 17/565,414

(22) Filed: Dec. 29, 2021

(65) Prior Publication Data

US 2023/0205832 A1    Jun. 29, 2023

(51) Int. Cl.
*G06F 16/34* (2019.01)
*G06F 16/9538* (2019.01)
(Continued)

(52) U.S. Cl.
CPC ........ *G06F 16/9538* (2019.01); *G06F 16/345* (2019.01); *G06F 16/9558* (2019.01); *G06F 40/284* (2020.01)

(58) Field of Classification Search
CPC .................................................... G06F 16/345
See application file for complete search history.

(56) References Cited

U.S. PATENT DOCUMENTS 10,229,111 B1    3/2019  Filippova et al.
2006/0161542 A1  7/2006  Cucerzan et al.
(Continued)

FOREIGN PATENT DOCUMENTS

EP    3346397 A1    7/2018

OTHER PUBLICATIONS

Hughes, et al., "Generating Better Search Engine Text Advertisements with Deep Reinforcement Learning", In Proceedings of the 25th ACM SIGKDD International Conference on Knowledge Discovery & Data Mining, Aug. 4, 2019, pp. 2269-2277.
(Continued)

*Primary Examiner* — Robert W Beausoliel, Jr.
*Assistant Examiner* — Nirav K Khakhar
(74) *Attorney, Agent, or Firm* — CALFEE, HALTER & GRISWOLD LLP

(57) ABSTRACT

Technologies related to generating diverse electronic summary documents for a webpage are described herein. A sequence of tokens is extracted from the webpage, and the sequence of tokens is provided to several computer-implemented models. The computer-implemented models output respective sets of candidate assets based upon the sequence of tokens, where the candidate assets are potentially included in an electronic summary document for the webpage. Subsequently, a user query is received, and at least one candidate asset from the candidate assets are selected for inclusion in the electronic summary document based upon the query. Thus, different electronic summary documents can be generated for the webpage when different queries are received.

20 Claims, 7 Drawing Sheets

(51) Int. Cl.
G06F 16/955 (2019.01)
G06F 40/284 (2020.01)

(56) References Cited

U.S. PATENT DOCUMENTS

| | | | |
|---|---|---|---|
| 2012/0143595 A1 | 6/2012 | Li et al. | |
| 2012/0290433 A1 | 11/2012 | England et al. | |
| 2016/0239490 A1 | 8/2016 | Dhamdhere et al. | |
| 2016/0306876 A1* | 10/2016 | Nichols | G06F 16/345 |
| 2017/0124447 A1 | 5/2017 | Chang et al. | |
| 2017/0277668 A1* | 9/2017 | Luo | G06F 16/345 |
| 2018/0253780 A1 | 9/2018 | Wang et al. | |
| 2018/0293313 A1 | 10/2018 | Hauptmann et al. | |
| 2019/0042551 A1 | 2/2019 | Hwang | |
| 2019/0130273 A1 | 5/2019 | Keskar et al. | |
| 2019/0392487 A1 | 12/2019 | Duke | |
| 2020/0364252 A1 | 11/2020 | Chang et al. | |
| 2022/0414134 A1 | 12/2022 | Chang et al. | |

OTHER PUBLICATIONS

"Final Office Action Issued in U.S. Appl. No. 16/414,337", dated May 7, 2021, 26 Pages.
"Notice of Allowance Issued in U.S. Appl. No. 16/414,337", dated May 11, 2022, 7 Pages.
"Non Final Office Action Issued in U.S. Appl. No. 16/414,337", dated Sep. 3, 2020, 19 Pages.
Bartz, et al., "Natural language generation for sponsored-search advertisements", In Proceedings of the 9th ACM Conference on Electronic Commerce, Jul. 8, 2008, pp. 1-9.
Bombarelli, et al., "Automatic chemical design using a data-driven continuous representation of molecules", In the Journal of ACS central science, vol. 4, Issue 2, Dec. 5, 2017, pp. 268-276.
Chopra, et al., "Abstractive Sentence Summarization with Attentive Recurrent Neural Networks", In Proceedings of the Conference of the North American Chapter of the Association for Computational Linguistics: Human Language Technologies, Jun. 12, 2016, pp. 93-98.
Devlin, et al., "Language models for image captioning: The quirks and what works", In Proceedings of the 53rd Annual Meeting of the Association for Computational Linguistics and the 7th International Joint Conference on Natural Language Processing, Jul. 27, 2015, pp. 100-105.
Fain, et al., "Sponsored Search: a Brief History", In Bulletin of the American Society for Information Science and Technology, vol. 32, Issue 2, Dec. 2006, 03 Pages.
Fujita, et al., "Automatic Generation of Listing Ads by Reusing Promotional Texts", In the Proceedings of the 12th International Conference on Electronic Commerce: Roadmap for the Future of Electronic Business, Aug. 2, 2010, pp. 179-188.
Gatys, et al., "Image style transfer using convolutional neural networks", In Proceedings of the IEEE Conference on Computer Vision and Pattern Recognition, Jun. 27, 2016, pp. 2414-2423.
Gulcehre, et al., "Pointing the unknown words", In Repository of arXiv:1603.08148v3, Aug. 21, 2016, 10 Pages.
Hidasi, et al., "Parallel recurrent neural network architectures for feature-rich session-based recommendations", In Proceedings of the 10th ACM Conference on Recommender Systems, Sep. 15, 2016, pp. 241-248.
Khatri, et al., "Abstractive and Extractive Text Summarization using Document Context Vector and Recurrent Neural Networks", In Repository of arxiv:1807.08000v1, Jul. 20, 2018, 9 Pages.
Kingma, et al., "Adam: A method for stochastic optimization", In repository of arXiv:1412.6980v9, Jan. 30, 2017, pp. 1-15.
Kryscinski, et al., "Improving abstraction in text summarization", In repository of arXiv:1808.07913v1, Aug. 23, 2018, 10 Pages.
Kumar, et al., "Predicting clicks: Ctr estimation of advertisements using logistic regression classifier", In Proceedings of IEEE International Advance Computing Conference, Jun. 12, 2015, pp. 1134-1138.
Lin, Chin-Yew, "Rouge: A package for automatic evaluation of summaries", In Proceedings of the Workshop on Text Summarization Branches Out, Post-Conference Workshop of ACL, Jul. 2004, 10 Pages.
Ling, et al., "Model ensemble for click prediction in bing search ads", In Proceedings of the 26th International Conference on World Wide Web Companion, Apr. 3, 2017, pp. 689-698.
Luong, et al., "Effective approaches to attention-based neural machine translation", In Proceedings of the Conference on Empirical Methods in Natural Language Processing, Sep. 17, 2015, pp. 1412-1421.
Nallapati, et al., "Summarunner: A recurrent neural network based sequence model for extractive summarization of documents", In Repository of arXiv:1611.04230v1, Nov. 14, 2016, 7 Pages.
Pasunuru, et al., "Multi-reward reinforced summarization with saliency and entailment", In Repository of arXiv:1804.06451v2, May 29, 2018, 9 Pages.
Paulus, et al., "A Deep Reinforced Model for Abstractive Summarization", In Journal of Computing Research Repository, May 11, 2017, 10 Pages.
"International Search Report & Written Opinion issued in PCT Application No. PCT/US20/023233", dated Jul. 1, 2020, 10 Pages.
Rennie, et al., "Self-critical sequence training for image captioning", In repository of arXiv:1612.00563v2, Nov. 16, 2017, 16 pages.
Richardson, et al., "Predicting Clicks: Estimating the Click-Through Rate for New Ads", In Proceedings of the 16th International Conference on World Wide Web, May 8, 2007, pp. 521-529.
Rush, et al., "A Neural Attention Model for Abstractive Sentence Summarization", In Proceedings of the Conference on Empirical Methods in Natural Language Processing, Sep. 17, 2015, pp. 379-389.
Sankaran, et al., "Temporal attention model for neural machine translation", In Repository,of arXiv:1608.02927v1, Aug. 9, 2016, 10 Pages.
See, et al., "Get to the point: Summarization with pointer-generator networks", In Proceedings of the 55th Annual Meeting of the Association for Computational Linguistics, Jul. 30, 2017, 20 Pages.
Shi, et al., "Neural Abstractive Text Summarization with Sequence-to-Sequence Models", In Repository of arXiv:1812.02303v1, Dec. 5, 2018, 29 Pages.
Sutskever, et al., "Sequence to sequence learning with neural networks", In Journal of Advances in neural information processing systems, Dec. 8, 2014, pp. 1-9.
Sutton, et al., "Reinforcement Learning: An Introduction", In Publication of MIT Press, Nov. 13, 2018, 444 Pages.
Thomaidou, Stamatina, "Automated Creation and Optimization of Online Advertising Campaigns", In the Thesis on Automated Creation and Optimization of Online Advertising Campaigns, Oct. 2014, 151 Pages.
Thomaidou, et al., "Automated Snippet Generation for Online Advertising", In Proceedings of the 22nd ACM International Conference on Information & Knowledge Management, Oct. 27, 2013, pp. 1841-1844.
Williams, Ronald J., "Simple statistical gradient-following algorithms for connectionist reinforcement learning", In Journal of Machine Learning, vol. 8, Issue 3-4, May 1992, pp. 229-256.
Wu, et al., "Google's neural machine translation system: Bridging the gap between human and machine translation", In Repository of arXiv:1609.08144v2, Oct. 8, 2016, pp. 1-23.
"Non-Final Office Action Issued in U.S. Appl. No. 17/901,885", dated Jun. 21, 2023, 22 Pages.

* cited by examiner

| Category | URL | Asset |
|---|---|---|
| Location | cubcreeksciencecamp.com | Cub Creek Scient and Animal Camp |
| Benefit | cubcreeksciencecamp.com | Let Your Kids Learn to Play |
| Return Policy | cubcreeksciencecamp.com | We're Open and Taking Reservations |
| Other | cubcreeksciencecamp.com | Fun for Kids of All Ages |
| Online Availability | cubcreeksciencecamp.com | Reserve Your Spot Online |
| Delivery | cubcreeksciencecamp.com | We're Open and Taking Reservations |
| Product or Service | cubcreeksciencecamp.com | Summer Science Camp |
| Call to Action | cubcreeksciencecamp.com | Learn More About Our Camp |
| Inventory and Selection | cubcreeksciencecamp.com | For All Ages & Skill Levels |
| Advertiser Name or Brand | cubcreeksciencecamp.com | Cub Creek Science & Animal Camp |
| Price and Fees | cubcreeksciencecamp.com | Affordable Summer Science Camp |
| Customer Problem | cubcreeksciencecamp.com | Looking for a Summer Camp? |

FIG. 4

GENERATING DIVERSE ELECTRONIC SUMMARY DOCUMENTS FOR A LANDING PAGE

BACKGROUND

Search engines are configured to return search results to users who submit queries to the search engines. A significant portion of revenue of a search engine is derived from display of electronic summary documents (e.g., text advertisements) together with search results on search engine results pages (SERPs) returned to users by the search engine. Typically, a search engine receives payment from an owner of an electronic summary document based upon the electronic summary document being selected by an end-user who submitted a query to the search engine.

An electronic summary document may include a selectable hyperlink that points to a landing page, such that a web browser loads the landing page when the electronic summary document is selected. In an example, the landing page is a webpage where a product or service may be acquired by users. Many websites include thousands of different webpages where products and/or services can be acquired by users, and thus owners of the websites desire to have electronic summary documents that point to such webpages. Historically, electronic summary documents that point to these webpages are generated manually. It can be ascertained, however, that generating electronic summary documents manually is highly expensive for a website that includes a large number of webpages, particularly when the webpages are subject to change.

Relatively recently, computer-implemented systems have been developed that automatically generate electronic summary documents based upon content of webpages that are pointed to by the electronic summary documents. These computer-implemented systems, however, are somewhat inflexible. Specifically, a conventional computer-implemented system that automatically constructs an electronic summary document for a webpage is able to generate only one electronic summary document for the webpage. Depending on content of the webpage, user context, and other factors, however, the electronic summary document generated by the computer-implemented system may not accurately reflect content of the webpage that will be of interest to the user, and thus a probability that the user will select the electronic summary document may be lower than desired.

SUMMARY

The following is a brief summary of subject matter that is described in greater detail herein. This summary is not intended to be limiting as to the scope of the claims.

Described herein are various technologies pertaining to generation of multiple, diverse electronic summary documents for a webpage, where the electronic summary documents each include a hyperlink to the webpage (and thus the webpage is a landing page for the electronic summary documents). An electronic summary document has a predefined format. Thus, an electronic summary document may have between one and three title assets, and between one and two description assets. A title asset has a number of words between a first lower threshold and a first upper threshold, and a description asset has a number of words between a second lower threshold and a second upper threshold. Further, a title asset has a first font and a first font size and may be displayed more prominently than a description asset. In an example, each description asset in the electronic summary document is displayed beneath one or more title assets in the electronic summary document, and each description asset is displayed in a second font having a second font size that is less than the first font size of the title assets of the electronic summary document.

A computer-implemented system that generates multiple, diverse electronic summary documents with respect to a webpage includes multiple computer-implemented models. In an example, at least one of the multiple computer-implemented models generates electronic summary documents in their entireties. In another example, at least one of the multiple computer-implemented models generates assets (title and/or description assets) but does not generate a full electronic summary document. The computer-implemented models may include at least one sequence-to-sequence model that generates an electronic summary document based upon content of a webpage. In another example, the computer-implemented models include at least one sequence-to-sequence model that generates multiple assets, where each asset corresponds to a respective category of asset (e.g., from amongst several categories of assets). Still further, the computer-implemented models may include a semi-extractive model that generates assets for a webpage based upon a sentence extracted from the webpage. In yet another example, the computer-implemented models include a reinforced model that generates an electronic summary document for a webpage while taking into consideration probability that the resultant electronic summary document will be selected by end users.

Therefore, several computer-implemented models generate candidate assets based upon content of a webpage, thereby forming a set of candidate assets for potential inclusion in an electronic summary document for the webpage. Optionally, one or more candidate assets in the set are filtered from the set based upon similarity of these candidate assets to other candidate assets in the set. For instance, if one title asset in the set is "cheap cars" and another title asset in the set is "inexpensive automobiles", one of such assets can be filtered due to the assets being semantically similar. In connection with determining semantic similarity between assets, each asset in the set of assets can be subjected to embedding, and assets can be filtered from the set of assets based upon embeddings for the assets. For example, distances between embeddings of assets is computed, and assets are filtered from the set based upon the computed distances.

The computer-implemented system further includes a stitching model that receives a query submitted by a user, and further optionally receives context pertaining to the query (e.g., time of submission of the query, location where the query was issued, type of browser from which the query was received, type of device from which the query was issued, etc.) and information about the issuer of the query (e.g., from an electronic profile of the user). The stitching model further receives the (remaining) candidate assets and selects one or more assets (and a sequence of the one or more assets) based upon the query and optionally the other information referenced above. Thus, the stitching model may select different assets and/or different sequences of assets when generating an electronic summary document for a webpage when different queries are received and/or when different users issue queries. The stitching model may be a deep neural network (DNN) that contemplate semantics of the assets when choosing which assets to include in an electronic summary document.

Thus, the technologies described herein relate to serving diverse electronic summary documents for a webpage, where each of the electronic summary documents is generated based upon content of the webpage. In a nonlimiting example, when a query submitted by a user includes a term or sequence of terms related to geographic location, an electronic summary document for a webpage that includes a location or location term in a title or description asset is generated. In another example, when the profile of a user who submits a query indicates that the user has a preference for a particular brand, an electronic summary document for a webpage that includes a brand name in a title and/or description asset is generated.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 illustrates a set of candidate assets generated by the category guided generator model.

DETAILED DESCRIPTION

Figure 1:
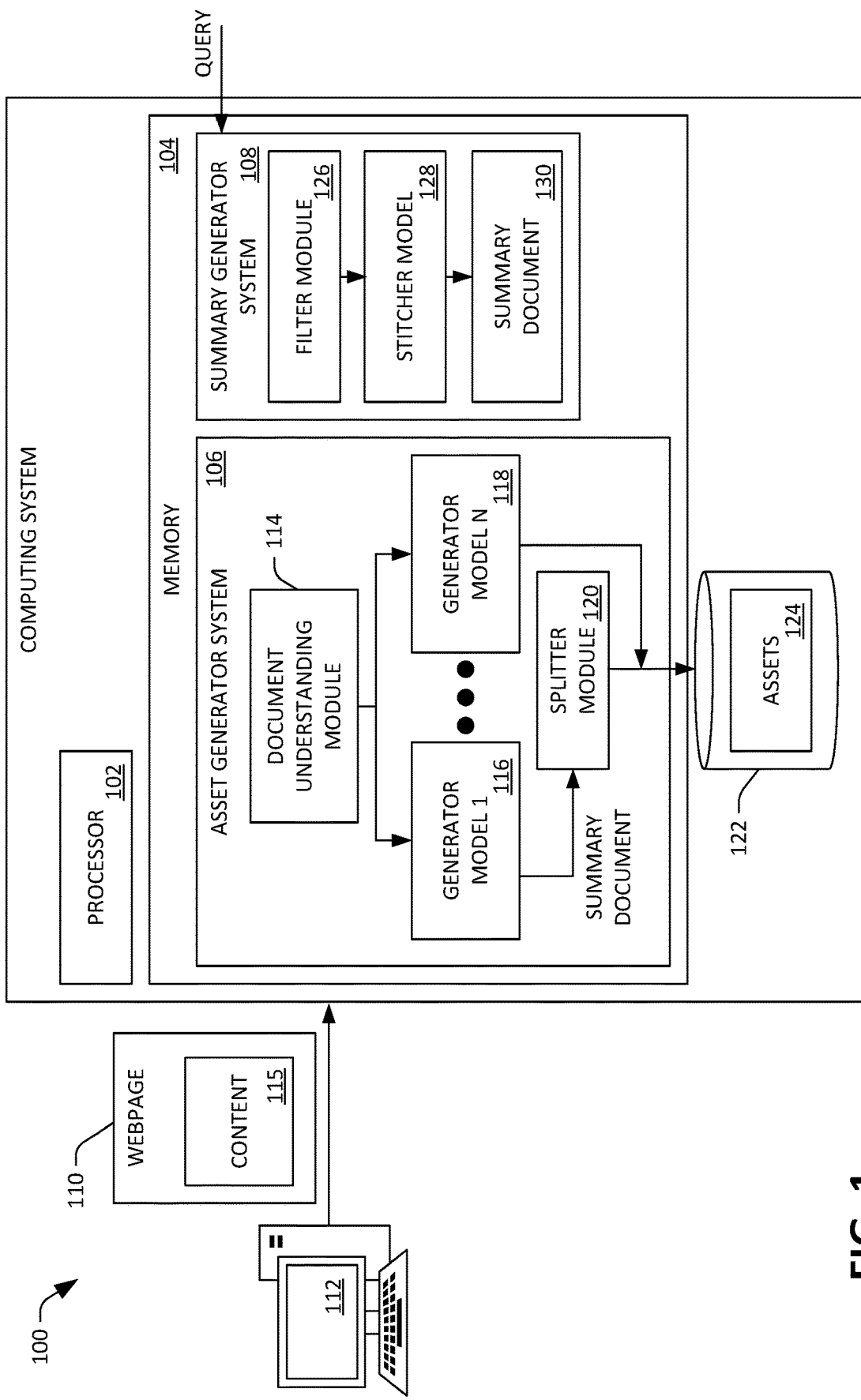
FIG. 1 is a functional block diagram of an example computing system that is configured to construct an electronic summary document for a webpage.

Various technologies pertaining to generating diverse electronic summary documents for webpages are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", "module", and "model" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Described herein are various technologies pertaining to generation of electronic summary documents for webpages, such that different electronic summary documents can be returned to a user or users in response to receipt of queries when the webpages are deemed to be relevant to the queries. Electronic summary documents are conventionally presented on search engine results pages (SERPs) in response to receipt of user queries. In a non-limiting example, an electronic summary document is a text advertisement. Historically, electronic summary documents for webpages have been generated manually by professionals, where the professionals construct the electronic summary documents to entice search engine users to select the electronic summary documents. More recently, computer-implemented technologies have been developed to automatically generate electronic summary documents for webpages (where the electronic summary documents link to the webpages, such that the webpages become landing pages). More particularly, automatic generation of electronic landing pages is particularly advantageous for websites that have a large number of webpages where products and/or services can be acquired, as costs of manual generation of electronic summary documents for the webpages may be high.

A deficiency with conventional computer-implemented technologies that automatically generate electronic summary documents for webpages is that such technologies are limited to generating a single electronic summary document per webpage. It can be ascertained, however, that content of a webpage may be summarized in a variety of different manners, and depending upon context (e.g., query submitted by a user, time that a query was submitted, location from which the query was submitted, etc.), one electronic summary document may be preferred over another, despite the electronic summary documents both being based upon the content of the webpage. The technologies described herein are configured to generate diverse electronic summary documents for a single webpage in an automated fashion, where a query submitted by a user and/or context associated with the query are considered when the electronic summary document is generated. These technologies are described in greater detail herein. Thus, two different electronic summary documents for a webpage may be returned to two different users who issue the same query. In another example, two different electronic summary documents for a webpage may be returned to a same user who issued a same query (at different times) due to context associated with the query changing.

Referring now to FIG. 1, a functional block diagram of a computing system 100 that constructs an electronic summary document for a webpage based upon content of the webpage is illustrated. The electronic summary document is configured to summarize content of the webpage page upon which the electronic summary document is generated, and further includes a link to the webpage (and thus the webpage is a landing page of the electronic summary document). The computing system 100 includes a processor 102 and memory 104, where the memory 104 includes an asset generator system 106 and a summary generator system 108. The computing system 100 obtains a webpage page 110 for which an electronic summary document is to be generated. For instance, the computing system 100 is provided with a uniform resource locator (URL) of the webpage page 110 and obtains the webpage 110 from a computing device 112 that is in network communication with the computing system 100. In an example, the webpage 110 includes information about a product and/or service that a reviewer of the webpage 110 may purchase by way of the webpage 110. Accordingly, an electronic summary document for the webpage 110 may be a text advertisement that corresponds to the webpage 110, such that the webpage 110 is presented to the user upon the user selecting the webpage 110.

Figure 2:
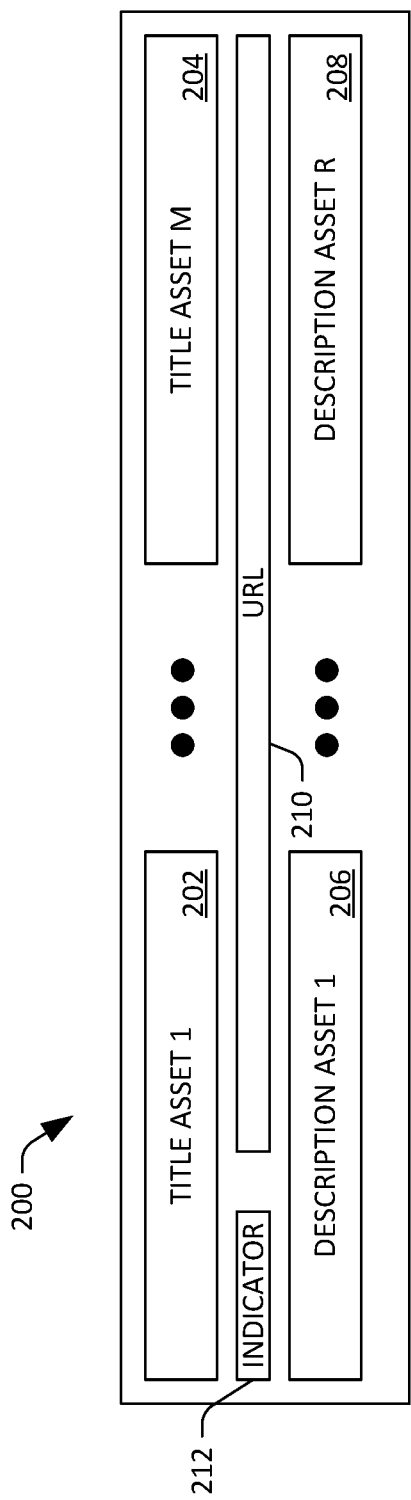
FIG. 2 is a schematic that depicts an electronic summary document.

Referring briefly to FIG. 2, an example electronic summary document 200 that can be generated by the computing system 100 is illustrated. The electronic summary document 200 conforms to a predefined format. More specifically, the electronic summary document 200 includes at least one title asset and at least one description asset. A title asset in the electronic summary document 200 may be positioned in a top line of the electronic summary document 200, while a description asset may be positioned beneath one or more title assets (such that the title assets are displayed more prominently than the description assets). Further, a title asset may have a first font and/or font characteristic (e.g., bold type, italicized type, may have a certain color, etc.) that is different than a font and or/font characteristic of a description asset, such that the title assets in the electronic summary document are visually distinguishable from the description assets in the electronic summary document.

In the example electronic summary document 200 shown in FIG. 2, the electronic summary document 200 includes several title assets 202-204 and several description assets 206-208, where each of the title assets 202-204 and each of the description assets 206-208 conforms to the predefined format. For instance, the predefined format can require that the electronic summary document 200 includes at least one title asset and no more than a predefined threshold number of title assets (e.g., no more than three title assets). Further, each title asset includes a number of words that is between a first lower threshold and a first upper threshold (e.g., between 1-10 words). Similarly, the predefined format can require that the electronic summary document 200 includes at least one description asset and no more than a predefined threshold number of description assets (e.g., no more than two description assets). Moreover, each description asset includes a number of words that is between a second lower threshold and a second upper threshold (e.g., between 1-20 words). The electronic summary document 200 also includes a URL 210 of a webpage summarized by the electronic summary document 200. Upon a user selecting the electronic summary document 200, the webpage pointed to by the URL 210 is loaded by a web browser and presented to the user. Further, the electronic summary document 200 may include an indicator 212 that informs a user that, for instance, the electronic summary document 200 is an advertisement for a product and/or service.

Returning to FIG. 1, operation of the asset generator system 106 and the summary generator system 108 is now described. The asset generator system 106 includes a document understanding module 114 that obtains the webpage 110 and recognizes portions of the webpage 110. The webpage 110 includes content 115, where the content 115 can include a title, section headers, body text, etc. The document understanding module 114 detects a language of the content 115 in the webpage 110, extracts a title from HTML of the webpage 110, detects a visual title in the content 115 of the webpage 110, detects a section heading in the content 115 of the webpage 110, detects paragraph text in the content 115 the webpage 110, etc. More generally, the document understanding module 114 parses HTML of the webpage 110 and extracts text therefrom based upon tags in the HTML of the webpage 110. In addition, the document understanding module 114 can employ natural language processing (NLP) technologies, image analysis technologies, and the like in connection with recognizing and extracting text from the content 115 of the webpage 110.

The document understanding module 114 concatenates together text extracted from the webpage 110 and assigns delimiters to different portions of the text, where example delimiters include "title", "section heading", "body text", and so forth. The document understanding module 114 tokenizes the concatenated text into a sequence of tokens $X=(x_1, x_2, \ldots, x_m)$. In an example, the tokens are plain text rather than specialized tokens—having the tokens in plain text rather than being specialized tokens is advantageous, as the asset generator system 106, as will be described below, includes multiple different generator models, where the different generator models may have different vocabularies.

The asset generator system 106 further includes several generator models 116-118, where each of the generator models 116-118 receives the sequence of tokens output by the document understanding module 114. Each of the generator models 116-118 generates a respective set of candidate assets for potential inclusion in an electronic summary document for the webpage 110, where the generator models 116-118 generate the sets of candidate assets based upon the sequence of tokens output by the document understanding module 114. Therefore, the first generator model 116 generates a first set of candidate assets based upon the sequence of tokens output by the document understanding module 114, and the Nth generator model 118 generates an Nth set of candidate assets based upon the sequence of tokens output by the document understanding module 114. The generator models 116-118 can generate title assets and/or description assets, and can label each generated asset as being a title asset or a description asset. In an example, the first generator model 116 generates only title assets. In another example, the first generator model 116 generates only description assets. In still yet another example, the first generator model 116 generates both title and description assets.

Further, pursuant to an example, one or more of the generator models 116-118 generates an electronic summary document for the webpage 110 based upon the sequence of tokens output by the document understanding module 114. In another example, the Nth generator model 118 generates a set of candidate assets for potential inclusion in the electronic summary document for the webpage 110 but does not generate an electronic summary document that conforms to the predefined format. Further, one or more of the generator models 116-118 is or includes a sequence-to-sequence model. Several example generator models that can be included in the generator models 116-118 will be described in greater detail below; regardless of the models included in the generator models 116-118, the models 116-

118 collectively output candidate assets for potential inclusion in an electronic summary document for the webpage 110.

The asset generator system 106 further includes a splitter module 120 that receives electronic summary documents generated by one or more of the generator models 116-118 that outputs electronic summary documents. The splitter module 120 extracts assets from the electronic summary documents output by the one or more models that output electronic summary documents. As noted above, an electronic summary document that conforms to the predefined format may include, for instance, two title assets and three description assets. The splitter module 120 extracts these assets from the electronic summary document such that the splitter module 120 outputs five separate assets (where each asset is labeled by the splitter module 120 as being a title asset or a description asset). Assets output by the splitter module 120 are concatenated with assets output by one or more of the generator models 116-118 that output candidate assets (but not electronic summary documents), and such candidate assets are stored in a data store 122 of the computing system 100 as candidate assets 124. Therefore, the asset generator system 106, based upon the content 115 of the webpage 110, generates numerous candidate assets for potential inclusion in an electronic summary document for the webpage 110.

The summary generator system 108 generates an electronic summary document for the webpage 110 based upon the candidate assets 124 generated by the asset generator system 106, and further based upon a query submitted by a user. In addition, the summary generator system 108 optionally generates the electronic summary document for the webpage 110 based upon context associated with the query (e.g., time of day, type of computer from which the query was received, information in an electronic profile of the user who issued the query, time of year, location from which the query was submitted, etc.).

The summary generator system 108 includes a filter module 126 that obtains candidate assets 124 from the data store 122 and filters candidate assets therefrom that are semantically similar to at least one other candidate asset in the candidate assets 124. For instance, the candidate assets 124 include a first candidate asset "great auto service" and a second candidate asset "best car service", which are semantically similar. To preclude these two candidate assets from being included in an electronic summary document together with one another, the filter module 126 identifies that these two candidate assets are semantically similar to one another, and filters one of such candidate assets from the candidate assets that are potentially included in the electronic summary document for the webpage 110.

The filter module 126 can employ any suitable approach in connection with filtering assets from the candidate assets 124. In an example, the filter module 126 utilizes embedding technologies to create embeddings for respective candidate assets in the candidate assets 124, where an embedding for a candidate asset is representative of semantics of the candidate asset. The filter module 126 can then compute distances between the embeddings, and filter one or more candidate assets from the candidate assets 124 based upon such computed distances. Pursuant to an example, the filter module 126 employs a determinantal point processes (DPP) algorithm in connection with filtering one or more candidate assets from the candidate assets 124.

The summary generator system 108 also includes a stitcher model 128 that obtains the candidate assets from the candidate assets 124 that were not filtered by the filter module 126, selects one or more assets from such candidate assets, and stitches together the selected assets to form an electronic summary document 130 for the landing page 110. In an example, the stitcher model 128 receives some predefined number of candidate assets, such as fifteen candidate assets; therefore, if the candidate assets 124 include 20 assets, the filter module 126 filters five of such assets and the remaining 15 candidate assets are provided to the stitcher model 128. The stitcher model 128 selects one or more of these candidate assets for inclusion in the electronic summary document 130.

The stitcher model 128 selects candidate assets for inclusion in the electronic summary document 130 based upon the received query, and optionally further based upon information about the user who submitted the query and context associated with the query. The stitcher model 128 further selects the one or more candidate assets for inclusion in the electronic summary document 130 based upon a probability that the issuer of the query will select the electronic summary document 130 (with the selected candidate assets therein) when the electronic summary document 130 includes the selected candidate assets and the electronic summary document 130 is presented to the user on a search results page.

With more specificity, the stitcher model 128 can be a deep neural network (DNN). In an example, the stitcher model 128 is a relatively large DNN with millions to billions of parameters that is trained to predict a probability that each candidate asset provided to the stitcher model 128 is optimally positioned at a specific position in the electronic summary document 130 (e.g., title position one, title position two, . . . , description position one, description position two, etc.). The stitcher model 128 is trained to receive assets one at a time and consider the received asset as well as previously received assets. The stitcher model 128 then stitches the selected candidate assets together in a sequential manner, first deciding if a candidate asset is suitable for a first title position in the electronic summary document 130, then deciding if the candidate asset is suitable for a second title position in the electronic summary document 130, and so forth.

Therefore, the summary generator system 108 creates the electronic summary document 130 for the webpage 110 by selecting one or more candidate assets from numerous sets of candidate assets generated by the several different generator models 116-118. Further, the summary generator system 108 selects candidate assets for inclusion in the electronic summary document 130 based upon the received query, and optionally further based upon information about the user who submitted the query and/or context associated with the query. Accordingly, the summary generator system 108 may generate different electronic summary documents based upon the same sequence of tokens extracted from the content 115 of the webpage 110. Advantageously over conventional approaches for generating electronic summary documents for webpages, then, the asset generator system 106 and the summary generator system 108 operate in conjunction to generate diverse electronic summary documents for the webpage 110. In addition, experiments have indicated improvements in click through rates for electronic summary documents output by the summary generator system 108 compared to click through rates for electronic summary documents that are generated through conventional approaches.

Additional information pertaining to generator models that may be included in the generator models 116-118 is now set forth. With respect to a generator model that may be included in the asset generator system 106, text generation can be formally described as generating a sequence of tokens $V=(y_1, y_2, \ldots, y_m)$ that are based upon input tokens X. Training data for training the generator models 116-118 includes electronic summary documents generated through conventional approaches and respective landing pages that correspond to the electronic summary documents. In an example, the training data includes electronic summary documents written by humans and their corresponding landing pages.

In an example, the generator models 116-118 include what is referred to herein as a "baseline model", where the baseline model is a transformer-based sequence-to-sequence model that is trained to maximize the conditional likelihood of Y given X in the training data, where the sequence-to-sequence model is trained with the teacher forcing technique. The sequence-to-sequence model includes a decoder that employs beam search with repetition penalty for decoding the output text sequence. In connection with training the sequence-to-sequence model, the training data can be subjected to cleaning to prevent, for example, overfitting. As indicated previously, electronic summary documents can be text advertisements, and some advertisers may have a large volume of advertisements (e.g., some relatively large e-commerce websites may include thousands of webpages by way of which products and/or services can be purchased, and thus there may be thousands of electronic summary documents associated with such webpages). To avoid the training data being dominated by electronic summary documents for a relatively small number of advertisers, a stratified sampling can be performed over the training data, and a per-advertiser cap can be enforced.

When the training data is split by Uniform Resource Locator (URL), validation and test data sets will include electronic summary documents for advertisers who have other electronic summary documents that were included in the training data. Thus, electronic summary documents in the validation and test data sets include many words that are similar to those included in electronic summary documents in the training data. It was observed that that the Rogue-L score based upon the validation data set increases as a number of training epochs increases. Upon the training data, validation data, and test data being split by advertiser, the Rouge-L score decreased after several training epochs, thereby indicating that splitting the training data, validation, and test data by advertiser facilitates avoidance of overfitting.

Further, electronic summary documents written by humans may include information that may not be inferred from the training data (e.g., a human may include terms and/or phrases in an electronic summary document that are nowhere to be found in a corresponding webpage). If the training data is not subjected to cleaning (to identify assets in electronic summary documents that are highly uncorrelated to a corresponding webpage), a trained computer-implemented model may generate assets that are unrelated to content of the webpage, and which may be factually incorrect. Cross-checking between the source sequence (tokens extracted from the webpage) and target sequence (sequences of text in assets of electronic summary documents) to ensure correlation therebetween improves accuracy of electronic summary documents generated by computer-implemented models and decreases the postprocessing filtration ratio. The baseline model is trained based upon the cleansed data. The baseline model, upon receipt of tokens extracted from the webpage 110, generates an electronic summary document for the webpage 110, where the electronic summary document includes numerous assets, and further where the splitter module 120 extracts the assets from the electronic summary document.

In another example, the generator models 116-118 may include what is referred to herein as a reinforced model. An example of the reinforced model is described in U.S. patent application Ser. No. 16/414,337, filed on May 16, 2019, and entitled "GENERATING ELECTRONIC SUMMARY DOCUMENTS FOR LANDING PAGES", the entirety of which is incorporated herein by reference. The reinforced is trained based upon the training data referenced above using reinforcement learning (RL) techniques and is configured to generate electronic summary documents that users find attractive (as evidenced by click probability of the electronic summary documents). Further, the reinforced model included in the generator models 116-118 may be an improvement upon the reinforced model referenced above. The improved model is motivated by previous shortcomings on learning from signals when electronic summary documents are generated; the immediate signal is missing from the rewards since the reward is only generated at the final step by a click model.

Pursuant to an example, and with respect to a RL problem, the states at step t are defined as $s_t$, actions are defined as $a_t$, and a policy model parameterized by $\theta$ is defined as $\pi_\theta$, where $\theta$: 1) defines the distribution of actions conditioned on states $\pi_\theta(a_t|s_t)$ so that $a_t \sim \pi_\theta(a_t|s_t)$; 2) reward at step t as $r_t$; 3) a sequence of states and actions as trajectory $\tau$, and where $\gamma_t$ is the discount rate to balance the long-term and short-term return. It is desirable to maximize the expected reward during the trajectory under the policy model $\pi_\theta$. The following objective function is conventionally optimized:

$$J(\theta)=E_{\pi_\theta}[\Sigma_{t=1}^T \gamma^{t-1} \cdot r_t | s_0], \qquad (1)$$

It can be ascertained that incorporating a step reward would speed up convergence and result in better model performance; accordingly, the reward mechanism has been redesigned and the penalty and reward have been decomposed to the token level so that the immediate signal can be captured in token level generation for the language model. In addition, instead of using a final reward as the signal, an intermediate total return $\Sigma_t = \Sigma_{k=t} \gamma^{k-t} \cdot r_t = \Sigma_{k=t}^{T-1} \cdot r_k + \gamma^{T-t} \cdot (C_T + \lambda \cdot RG_T)$ is used as a temporary signal for learning, where $C_T$ is the click score, and $RG_T$ is the rouge score between the predicted and target electronic summary documents obtained in the final step. To better control the quality with pareto gain, a rouge score and langrangian multiplier $\lambda$ is used as a hyperparameter.

Considering the total return as a temporary signal, the model is optimized by way of $$\nabla_\theta J(\theta) \sim \frac{1}{|\tau|} \Sigma_\tau (G_t^s - G_t^b) \cdot \nabla_\theta \log D_\theta^\tau$$

by Monte-Carlo estimate, where $D_\theta^T$ is defined as the trajectory distribution, i.e., the joint distribution of the sampled sequence in this case, and $G_t^s$ and $G_t^b$ are total return at time t for sampled and baseline sequence correspondingly. The model redesign has also been observed to bring about pareto improvement on performance with respect to quality (rouge) and attractiveness (click) score. Similar to the baseline model, the reinforced model generates an electronic summary document based upon the sequence of tokens output by the document understanding module 114, where the electronic summary document includes several assets (both title assets and description assets). Typically, the electronic summary document generated by the baseline model is different from the electronic summary document generated by the reinforced model, and thus different sets of candidate assets are extracted from such electronic summary documents.

The generator models 116-118 may also include a category-guided generator model that generates a set of candidate assets based upon the content 115 of the webpage, where each candidate asset in the set corresponds to a different category of asset. Professionals that generate electronic summary documents manually craft different assets and associate those assets with different categories. For instance, a professional may assign an asset a category such as "location", "benefit", "return policy", "other", "online availability", "delivery", "product or service", "call to action", "inventory and selection", "advertiser name or brand", "price and fees", or "customer problem". For instance, an asset assigned the "location" category includes location information therein (e.g., a location where a good or service exists or can be acquired). In another example, an asset assigned the "benefit" category describes a benefit of a product or service that is available for acquisition on a webpage. In yet another example, an asset assigned the "return policy" category includes information about a return policy for a product.

Figure 3:
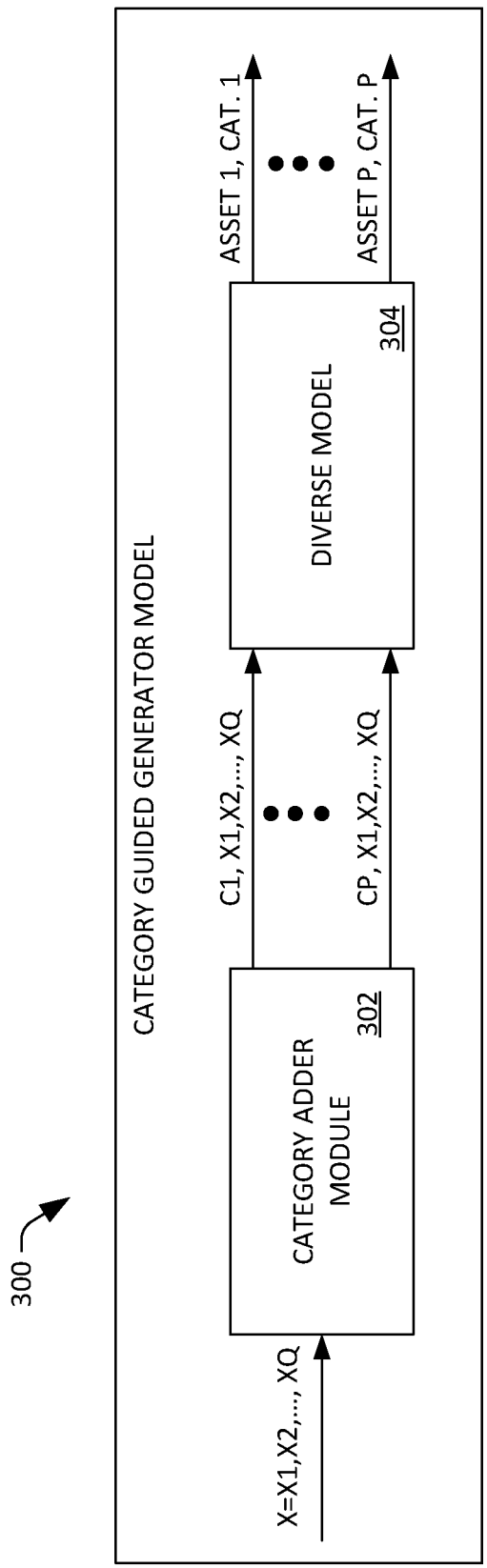
FIG. 3 is a functional block diagram of a category guided generator model that generates candidate assets for potential inclusion in an electronic summary document for a landing page.

The category guided generator model, based upon the content 115 of the webpage 110, generates a candidate asset for each category for which the category guided generator model has been trained. Referring to FIG. 3, a functional block diagram of the category guided generator model 300 is depicted. The category guided generator model 300 is trained based upon a set of training data, where the training data includes sequences of tokens extracted from webpages, assets that correspond to such webpages, and categories assigned to the assets. At least some of the training data includes assets with categories assigned thereto by humans. The training data also includes assets having categories assigned thereto by a multi-class classifier.

For instance, a set of assets and category labels assigned thereto by humans can be used to train a multi-class classifier, where the trained multi-class classifier receives an asset and assigns a category (from amongst several categories) to the asset. The classifier is provided with target output sequences Y in the training data described above with respect to the baseline model such that the assets are each assigned a category. The category assigned to an asset is then assigned to the input sequence of tokens upon which the asset was generated. More formally, the input sequence of tokens becomes $(c_i, x_1, x_2, \ldots, x_n)$, with $c_i$ being one of i categories (e.g., 13 categories). The category guided generator model 300 includes a sequence-to-sequence model that is trained based upon this updated training data, and therefore the sequence-to-sequence model learns to generate an output sequence (candidate asset) in the category specified in the input token sequence.

The category guided generator model 300 includes a category adder module 302 that receives the sequence of tokens output by the document understanding module 114. The category adder module 302 constructs P sequences of tokens, one sequence of tokens for each of P categories upon which the sequence-to-sequence model of the category guided generator model 300 has been trained. Each of the P sequences of tokens has a respective category identifier associated therewith (e.g., prepended thereto). Therefore, for instance, the category adder module 302 creates a first sequence of tokens by prepending a first category identifier (e.g., a category identifier for the "location" category) to the sequence of tokens output by the document understanding module 114; the category adder module 302 creates a second sequence of tokens by prepending a second category identifier (e.g., a category identifier for the "benefit" category) to the sequence of tokens output by the document understanding module 114, etc.

The category guided generator model 300 further includes a diverse model 304 that receives each sequence of tokens in the P sequences of tokens (one at a time) and outputs P candidate assets based upon the P sequence of tokens. Therefore, based upon the first sequence of tokens output by the category adder module 302, the diverse model 304 outputs a first candidate asset that corresponds to the first category. Similarly, based upon the Pth sequence of tokens output by the category adder module 302, the diverse model 304 generates a Pth candidate asset that corresponds to the Pth category. As described above, the diverse model 304 can be or include a sequence-to-sequence model, where such model can be trained based upon the training data used to train the baseline model.

FIG. 4 illustrates an example output 400 of the category guided generator model 300 with respect to a webpage, where the output includes thirteen candidate assets, with the category guided generator model 300 outputting a candidate asset for each of thirteen different categories. These candidate assets can be included in a set of candidate assets for potential inclusion in an electronic summary document for the webpage.

Returning again to FIG. 1, the generator models 116-118 may further include a semi-extractive generator model, which is particularly well-suited for generating relatively short candidate assets, such as candidate assets having between three and five words. The semi-extractive generator model was developed based upon an observation that text in a title asset for a webpage is typically based upon a single sentence from the webpage. The semi-extractive generator model decomposes the asset generation process into two steps: 1) the semi-extractive generator model extracts a sentence $(s_1, s_2, \ldots, s_k)$ from the input sequence $(x_1, x_2, \ldots, x_n)$, where $s_1, \ldots, s_k$ are consecutive tokens in $(x_1, x_2, \ldots, x_n)$ that form a sentence; and 2) the semi-extractive generator model generates a candidate asset based upon the selected sentence $S=(s_1, s_2, \ldots, s_k)$. The semi-extractive generator model may include two separate models for performing the two steps. The first model is a binary classifier that obtains the title of the webpage 110 and S as input, and outputs a confidence that the sentence is to be used as a source for generating a title asset. The second model can be a sequence-to-sequence model that generates Y based upon the input sequence S.

To create training data for the two models, the input sequence was split into sentences to obtain all possible pairs of S, Y. Each pair is then analyzed to ascertain whether the following condition is met: each token in Y is contained within S. This strict rule guarantees that information in the output sequence is contained within the input sequence, and the examples that satisfy the condition are used to train the classifier and the sequence-to-sequence model. When the semi-extractive generator model receives the sequence of tokens output by the document understanding module 114, then, the classifier is used to select a top threshold number of sentences, which are in turn used to generate a set of candidate assets for potential inclusion in the electronic summary document 130.

Therefore, in summary, the generator models 116-118 generate multiple sets of candidate assets for potential inclusion in the electronic summary document 130 for the webpage 110. These multiple sets of candidate assets are concatenated together and stored as the candidate assets 124 in the data store 122. A candidate asset in the candidate assets 124 that is semantically similar to another candidate asset can be filtered from the candidate assets 124 to prevent such assets from being included in a same electronic summary document for the webpage 110. This filtering can be performed prior to a query being received or in response to the query being received. Based upon the received query, the stitcher model 128 selects one or more assets from the candidate assets 124 and creates the electronic summary document 130 based upon the received query (and optionally further based upon information pertaining to the user who submitted the query and context associated with the query).

Figure 5:
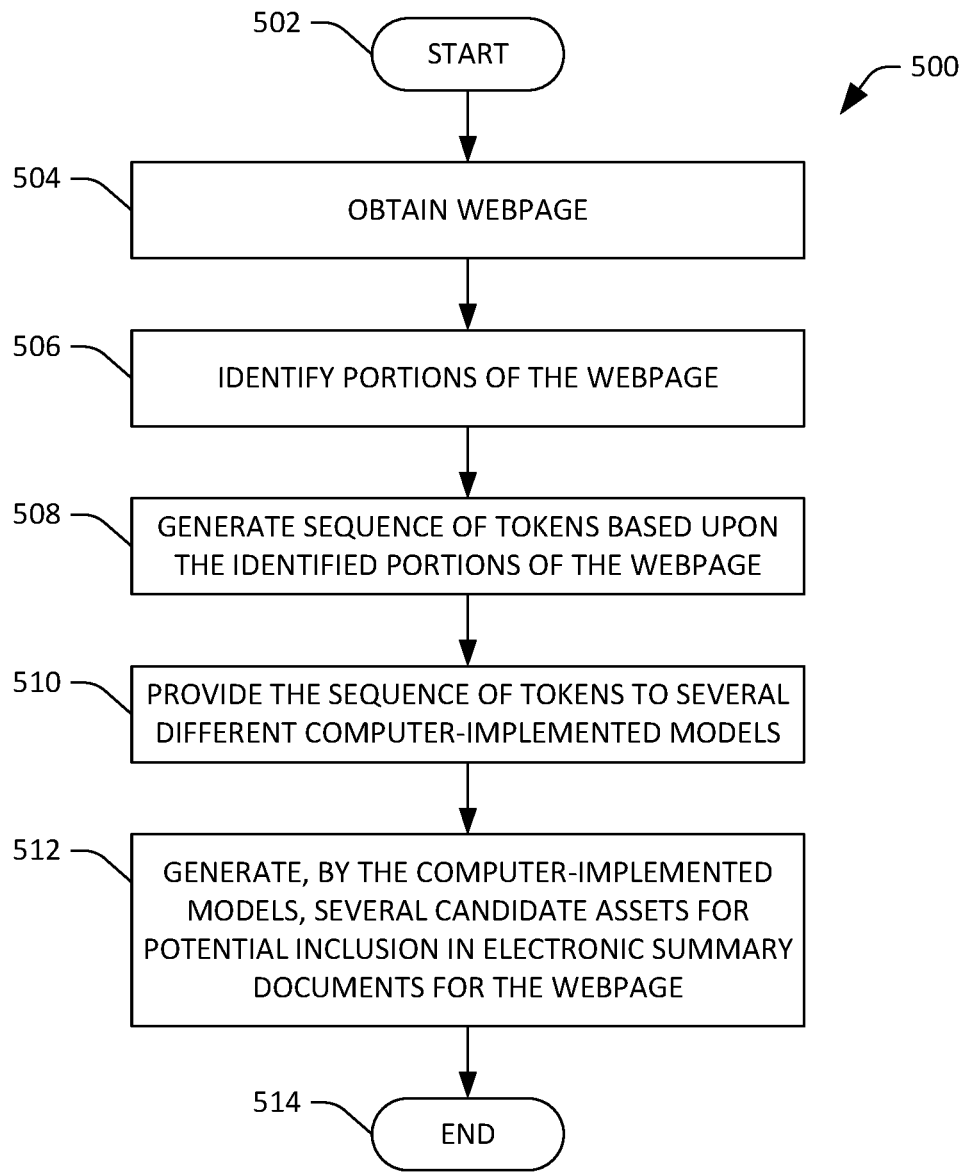
FIG. 5 is a flow diagram that illustrates an example methodology for generating candidate assets for potential inclusion in an electronic summary document for a webpage.
Figure 6:
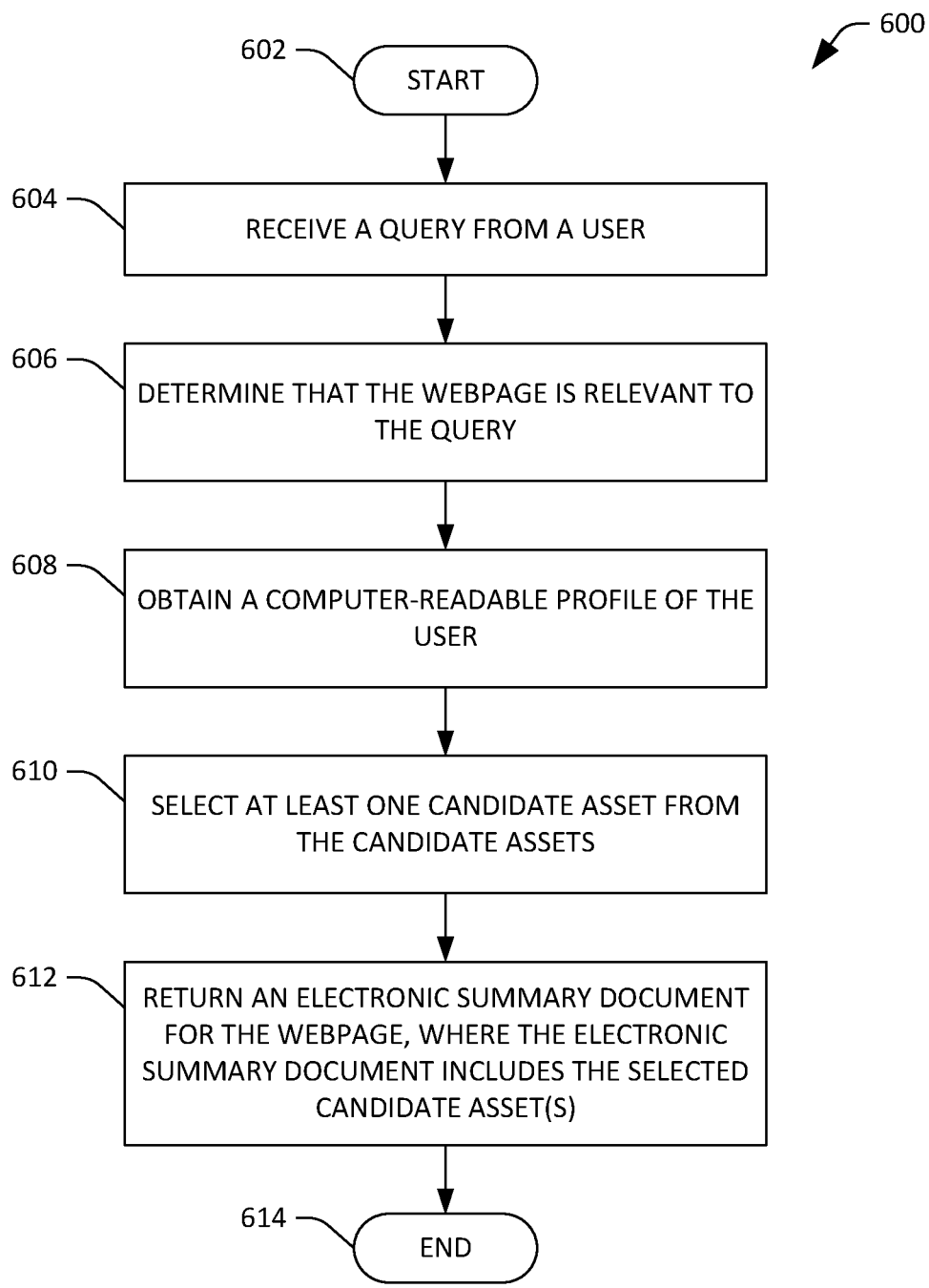
FIG. 6 is a flow diagram that illustrates an example methodology for generating an electronic summary document for a webpage in response to receipt of a query.

FIGS. 5-6 illustrate example methodologies relating to generating an electronic summary document for a webpage, where the electronic summary document is generated based upon the webpage and includes a link to the webpage. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference solely to FIG. 5, a flow diagram illustrating an example methodology 500 for generating multiple sets of candidate assets for potential inclusion in an electronic summary document for a webpage is depicted. The methodology 500 starts at 502, and at 504 a webpage is obtained. At 506, portions of the webpage are identified based upon a parsing of HTML of the webpage and/or analysis of a rendered image of the webpage. These identified portions may include a title of the webpage, a visual title of the webpage, section headings in the webpage, body text in the webpage, etc.

At 508, a sequence of tokens is generated based upon the identified portions of the webpage. The sequence of tokens is representative of content of the webpage.

At 510, the sequence of tokens is provided to several different computer-implemented models, where each of the models is configured to generate at least one candidate asset based upon the sequence of tokens. In an example, the several different computer-implemented models are collectively configured to generate between 10 and 25 candidate assets. In another example, the several different computer-implemented models are configured to collectively generate between 25 and 50 candidate assets.

At 512, several candidate assets are generated by the computer-implemented models, where the candidate assets are generated for potential inclusion in electronic summary documents for the webpage. The methodology 500 completes at 514.

Now Referring to FIG. 6, a flow diagram illustrating an example methodology for constructing an electronic summary document for a webpage based upon the candidate assets generated by way of the methodology 500 is depicted.

The methodology 600 starts at 602, and at 604 a query is received from a user. At 606, a determination is made that the webpage is relevant to the query. At 608, a computer-readable profile of the user is optionally obtained. At 610, at least one candidate asset is selected from the candidate assets generated by way of the methodology 500, where the at least one candidate asset is selected based upon the query received from the user and optionally based upon the computer-readable profile of the user, and further optionally based upon context associated with the query. At 612, an electronic summary document is returned as search result for inclusion in a search results page, where the electronic summary document includes the at least one candidate asset selected at 610. Further, the electronic summary document conforms to a predefined format for electronic summary documents. The methodology 600 completes at 614.

Figure 7:
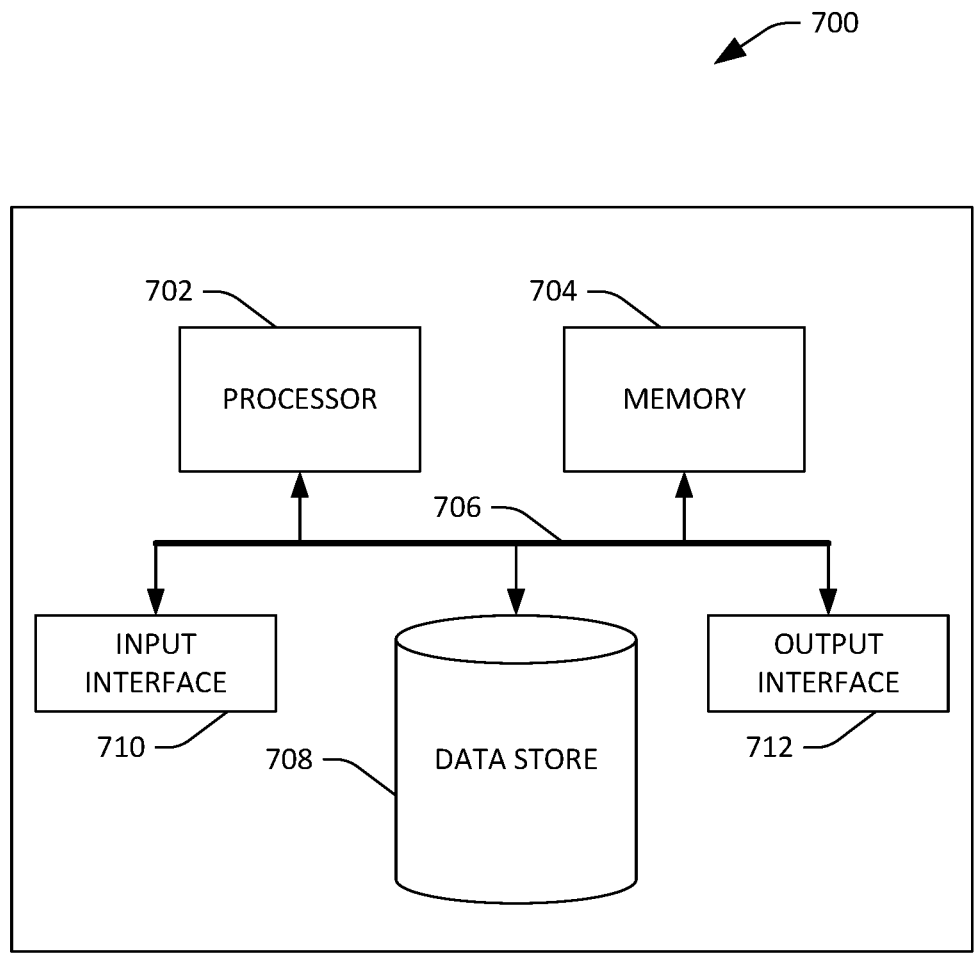
FIG. 7 is an example computing system.

Referring now to FIG. 7, a high-level illustration of an exemplary computing device 700 that can be used in accordance with the systems and methodologies disclosed herein is illustrated. For instance, the computing device 700 may be used in a system that is configured to generate candidate assets for potential inclusion in an electronic summary document of a webpage. By way of another example, the computing device 700 can be used in a system that is configured to construct an electronic summary document for a webpage based upon candidate assets generated for the webpage. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store content from a webpage, candidate assets, etc.

The computing device 700 additionally includes a data store 708 that is accessible by the processor 702 by way of the system bus 706. The data store 708 may include executable instructions, content from a webpage, candidate assets, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
   providing a sequence of tokens to a first computer-implemented model, wherein the sequence of tokens is obtained from a webpage that is to be summarized by an electronic summary document, wherein the electronic summary document is to conform to a predefined format;
   generating, by the first computer-implemented model, a set of candidate assets for potential inclusion in the electronic summary document, where each candidate asset in the set of candidate assets respectively corresponds to a different category of asset;
   subsequent to generating the set of candidate assets for the electronic summary document, receiving a query from a user, wherein the webpage is identified as being relevant to the query;
   in response to receiving the query from the user, providing the set of candidate assets and the query to a second computer-implemented model;
   generating, by the second computer-implemented model, the electronic summary document for the webpage based upon the set of candidate assets and the query, wherein the electronic summary document comprises an asset from the set of candidate assets and conforms to the predefined format; and
   returning the electronic summary document to the user as a portion of a search results page.

2. The computing system of claim 1, wherein the computing system retrieves the webpage based upon a uniform resource locator (URL) of the webpage, and further wherein the electronic summary document includes a hyperlink that points to the URL of the webpage.

3. The computing system of claim 1, the acts further comprising:
   providing the sequence of tokens to a third computer-implemented model;
   generating, by the third computer-implemented model, a second set of candidate assets based upon the sequence of tokens; and
   providing the second set of candidate assets to the second computer-implemented model together with the set of candidate assets, wherein the second computer-implemented model generates the electronic summary document for the electronic landing page based further upon the second set of candidate assets.

4. The computing system of claim 3, wherein the first computer-implemented model and the second computer-implemented model are sequence-to-sequence models, and further wherein the first computer-implemented model and the second computer-implemented model are both trained based upon a common set of training data.

5. The computing system of claim 3, wherein the third computer-implemented model generates a second electronic summary document for the webpage, the second electronic summary document comprises the second set of candidate assets, the acts further comprising extracting the second set of candidate assets from the second electronic summary document prior to providing the second computer-implemented model with the second set of candidate assets.

6. The computing system of claim 1, wherein the electronic summary document comprises a title asset and a description asset, the predefined format specifies a minimum number of words in the title asset, a maximum number of words in the title asset, a minimum number of words in the description asset, and a maximum number of words in the description asset.

7. The computing system of claim 1, the acts further comprising:
providing the sequence of tokens to a third computer-implemented model;
generating, by the third computer-implemented model, a second electronic summary document for the webpage based upon the sequence of tokens and a computed probability that a user will select the second electronic summary document when provided as a search result, wherein the second electronic summary document includes a second set of candidate assets; and
providing the second set of candidate assets to the second computer-implemented model together with the set of candidate assets, wherein the second computer-implemented model generates the electronic summary document for the webpage based further upon the second set of candidate assets.

8. The computing system of claim 1, the acts further comprising:
providing the sequence of tokens to a third computer-implemented model;
generating, by the third computer-implemented model, a candidate asset for the webpage based upon the sequence of tokens, wherein generating the candidate asset for the webpage comprises:
computing a probability score for a sentence in the sequence of tokens, the probability score indicative of a probability that an asset is capable of being constructed from the sentence;
selecting the sentence based upon the probability score computed for the sentence; and
generating a candidate asset based upon the sentence; and
providing the candidate asset to the second computer-implemented model together with the set of candidate assets, wherein the second computer-implemented model generates the electronic summary document for the webpage based further upon the candidate asset.

9. The computing system of claim 1, wherein generating, by the second computer-implemented model, the electronic summary document for the webpage based upon the set of candidate assets comprises:
computing a distance between a first candidate asset and a second candidate asset in the set of candidate assets; and
precluding the first candidate asset and the second candidate asset from being included together in the electronic summary document based upon the similarity score.

10. The computing system of claim 1, wherein the electronic summary document includes two positions for title assets in the electronic summary document, and further wherein the second computer-implemented model generates the electronic summary document by:
first predicting whether a first candidate asset in the candidate assets is suitable for a first position for title assets in the two positions; and
subsequently predicting whether a second candidate asset in the candidate assets is suitable for a second position for title assets in the two positions.

11. The computing system of claim 1, the acts further comprising:
obtaining an electronic user profile of the user who submitted the query, wherein the electronic summary document for the webpage is generated based upon the electronic user profile of the user.

12. A method for generating an electronic summary document for a webpage, the method comprising:
providing a sequence of tokens to multiple different computer-implemented models, wherein the sequence of tokens is obtained from the webpage that is to be summarized by the electronic summary document, and further wherein the electronic summary document is to comprise two assets;
generating, by the multiple different computer-implemented models, multiple different candidate assets, wherein each of the multiple different computer-implemented models generates at least one candidate asset;
subsequent to generating the multiple different candidate assets, receiving a query set forth by a user;
determining that the webpage is related to the query;
based upon the webpage being determined to be related to the query, providing the query and the multiple different candidate assets to a computer-implemented model as input to the computer-implemented model; and
generating, by the computer-implemented model, the electronic summary document for the webpage based upon the multiple different candidate assets and the query, wherein the electronic summary document comprises two candidate assets from the multiple different candidate assets.

13. The method of claim 12, wherein the webpage is retrieved based upon a uniform resource locator (URL) of the webpage, and further wherein the electronic summary document includes a hyperlink that comprises the URL.

14. The method of claim 12, further comprising:
wherein the multiple computer-implemented models comprise a first computer-implemented model that generates a first plurality of candidate assets based upon the sequence of tokens, wherein each candidate asset in the first plurality of candidate assets has a different category corresponding thereto, and further wherein the multiple different candidate assets include the first plurality of candidate assets.

15. The method of claim 14, wherein the multiple computer-implemented models comprise a second computer-implemented model that generates a second electronic summary document based upon the sequence of tokens, wherein the second electronic summary document comprises a plurality of candidate assets, and further wherein the multiple different candidate assets include the plurality of candidate assets.

16. The method of claim 15, wherein the multiple computer-implemented models comprise a third computer-implemented model that generates a third electronic summary document based upon the sequence of tokens, wherein the third computer-implemented model generates the third electronic summary document based upon a computed probability that the third electronic summary document will be selected by an arbitrary user when presented as a search result on a search engine results page (SERP), wherein the third electronic document comprises a second plurality of candidate assets, and further wherein the multiple different candidate assets include the second plurality of candidate assets.

17. The method of claim 16, wherein the multiple computer-implemented models comprises a fourth computer-implemented model that generates a candidate asset based upon a sentence extracted from the webpage, wherein the multiple different candidate assets include the candidate asset generated by the fourth computer-implemented model.

18. The method of claim 12, wherein the electronic summary document conforms to a predefined format for electronic summary documents.

19. The method of claim 12, further comprising:
subsequent to receiving the query from the user, receiving a second query from a second user;
determining that the webpage is related to the second query;
based upon the webpage being determined to be related to the second query, providing the second query and the multiple different candidate assets to the computer-implemented model as input to the computer-implemented model;
generating, by the computer-implemented model, a second electronic summary document for the webpage that is different from the electronic summary based, the second electronic summary document is generated based upon the multiple different candidate assets and the second query.

20. A computer-readable storage medium comprising instructions that, when executed by a processor, cause the processor to perform acts comprising:
providing a sequence of tokens to a first computer-implemented model, wherein the sequence of tokens is obtained from a webpage that is to be summarized by an electronic summary document, wherein the electronic summary document is to conform to a predefined format for electronic summary documents;
generating, by the first computer-implemented model, a set of candidate assets, where each candidate asset in the set of candidate assets respectively corresponds to a different category of asset;
subsequent to generating the set of candidate assets, receiving a query from a user, wherein the webpage is determined to be related to the query;
in response to receipt of the query, providing the set of candidate assets and the query to a second computer-implemented model as input to the second computer-implemented model; and
generating, by the second computer-implemented model, the electronic summary document for the webpage based upon the set of candidate assets and the query, wherein the electronic summary document conforms to the predefined format for electronic summary documents.

\* \* \* \* \*